United States Patent
Dinan et al.

(10) Patent No.: US 8,130,728 B1
(45) Date of Patent: Mar. 6, 2012

(54) DYNAMIC TRANSMISSION OF DCD AND UCD MESSAGES IN A WIMAX NETWORK

(75) Inventors: Esmail Dinan, Herndon, VA (US); Swati Tiwari, Fairfax, VA (US); Hemanth Balaji Pawar, Herndon, VA (US); Krishna Sitaram, Chantilly, VA (US); Jong-hak Jung, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 711 days.

(21) Appl. No.: 12/235,948

(22) Filed: Sep. 23, 2008

(51) Int. Cl.
*H04B 7/216* (2006.01)
(52) U.S. Cl. .......................... 370/335; 370/229; 455/500
(58) Field of Classification Search .................. 370/310, 370/338, 335, 229–231; 455/500
See application file for complete search history.

(56) References Cited

U.S. PATENT DOCUMENTS

| | | | |
|---|---|---|---|
| 2007/0202882 A1* | 8/2007 | Ju et al. | 455/450 |
| 2009/0197599 A1* | 8/2009 | Cho et al. | 455/434 |
| 2009/0298504 A1* | 12/2009 | Lee et al. | 455/437 |

\* cited by examiner

*Primary Examiner* — Gary Mui
(74) *Attorney, Agent, or Firm* — McDonnell Boehnen Hulbert & Berghoff LLP

(57) ABSTRACT

Disclosed herein is a method and system for transmitting coding descriptor information that can be implemented in a WiMAX communication network. The method comprises (a) dividing the coding descriptor information into a first set and a second set of coding descriptor information, wherein the first set comprises coding descriptor information that is used in initial ranging; (b) determining a repetition frequency at which to periodically transmit the first set of coding descriptor information; (c) periodically transmitting the first set of coding descriptor information at the determined repetition frequency; (d) detecting a triggering event, wherein the triggering event comprises receipt of a message from an access terminal; and (e) in response to detecting the triggering event, transmitting the second set of coding descriptor information.

18 Claims, 7 Drawing Sheets

| CINR (db) | CQI | DL MCS | MIMO |
|---|---|---|---|
| <=3 | 0 | QPSK 1/12 | STC |
| -2 | 1 | QPSK 1/12 | STC |
| -1 | 2 | QPSK 1/8 | STC |
| 0 | 3 | QPSK 1/8 | STC |
| 1 | 4 | QPSK 1/4 | STC |
| 2 | 5 | QPSK 1/4 | STC |
| 3 | 6 | QPSK 1/4 | STC |
| 4 | 7 | QPSK 1/4 | STC |
| 5 | 8 | QPSK 1/2 | STC |
| 6 | 9 | QPSK 1/2 | STC |
| 7 | 10 | QPSK 1/2 | STC |
| 8 | 11 | QPSK 3/4 | STC |
| 9 | 12 | QPSK 3/4 | STC |
| 10 | 13 | QPSK 3/4 | STC |
| 11 | 14 | 16QAM 1/2 | STC |
| 12 | 15 | 16QAM 1/2 | STC |
| 13 | 16 | 16QAM 1/2 | STC |
| 14 | 17 | 16QAM 3/4 | STC |
| 15 | 18 | 16QAM 3/4 | STC |
| 16 | 19 | 16QAM 3/4 | STC |
| 17 | 20 | 64QAM 2/3 | STC |
| 18 | 21 | 64QAM 2/3 | STC |
| 19 | 22 | 64QAM 3/4 | STC |
| 20 | 23 | 64QAM 5/6 | STC |
| 21 | 24 | 64QAM 5/6 | STC |
| 22 | 25 | 64QAM 5/6 | STC |
| 23 | 26 | 16QAM 3/4 | SM |
| 24 | 27 | 16QAM 3/4 | SM |
| 25 | 28 | 64QAM 2/3 | SM |
| 26 | 29 | 64QAM 2/3 | SM |
| 27 | 30 | 64QAM 3/4 | SM |
| >=28 | 31 | 64QAM 5/6 | SM |

FIG. 6

DYNAMIC TRANSMISSION OF DCD AND UCD MESSAGES IN A WIMAX NETWORK

BACKGROUND

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on. It is expected that by the year 2009 there will be in excess of 100 million devices in use that have WiMAX chipsets in them. Thus, a virtual explosion of the number of WiMAX devices is expected to occur in the near future.

In order to engage in communications, the client and the WiMAX base station synchronize on both the downlink and the uplink. Thus, when initiating a WiMAX communication session, the client secures a downlink connection to receive data from the WiMAX network, as well as an uplink connection to send data to the WiMAX network. Accordingly, a WiMAX base station periodically broadcasts a downlink coding descriptor (DCD) and an uplink coding descriptor (UCD), which include information that can be used by the mobile to synchronize with a base station on both the downlink and the uplink, respectively. The DCD and UCD, which may each generally be referred to as a coding descriptor (or collectively referred to as coding descriptors), are broadcast messages. Thus, the DCD and UCD are made available to any client within range of the base station that is broadcasting these coding descriptors.

Under current practices, a WiMAX base station transmits the DCD and UCD periodically, by from time to time including a DCD and a UCD in a WiMAX frame. Thus, a DCD and a UCD are not necessarily included in every WiMAX frame. The repetition frequency with which the DCD and UCD are broadcast by a WiMAX base station (i.e. how often the base station includes the DCD and UCD in a WiMAX frame) is configurable. For example, a base station may, by default, transmit a DCD and UCD every 25 milliseconds. However, a service provider may configure the base station to transmit the DCD and UCD more or less frequently than every 25 milliseconds, for instance.

OVERVIEW

When a DCD and UCD are included in a frame, network resources are designated for the transmission of the DCD and the UCD and thus can no longer be designated for downlink and/or uplink user traffic. As a result, inefficient transmission of coding descriptors (e.g., transmitting the coding descriptors when the information included therein is not needed by clients) may lead to inefficient use of network resources and reduced network throughput. It is therefore desirable to provide a method and system that helps to improve the efficiency with which a WiMAX network transmits coding descriptors. To help improve efficiency, the information provided by the UCD and/or DCD, which has typically been sent all-at-once in a given WiMAX frame, may be partitioned and relayed to the client via multiple transmissions (e.g., spread throughout multiple frames).

More specifically, in an exemplary embodiment, certain coding descriptor information (from the DCD and/or UCD) may be identified as "critical" or "high-priority." This critical coding descriptor information may then be transmitted periodically. Further, the period between transmissions may be determined and/or adjusted based on the congestion (or lack thereof) in the WiMAX network (or a portion thereof). Generally, critical information will include information used in the initial ranging process. Non-critical coding descriptor information, which is typically information other than that used in initial ranging, may then be sent on an as-needed basis, when such information is required by the client. In particular, non-critical coding descriptor information may be transmitted in response to certain triggering events that indicate that the client is about to take an action or engage in a process based upon, using, or requiring the non-critical coding descriptor information.

In one aspect, a method for transmitting coding descriptor information is disclosed. The method may be carried out in a communications network that provides WiMAX service. Further, the coding descriptor information may comprise downlink coding descriptor information and uplink coding descriptor information. The method comprises (a) dividing the coding descriptor information into a first set and a second set of coding descriptor information, wherein the first set comprises coding descriptor information that is used in initial ranging; (b) determining a repetition frequency at which to periodically transmit the first set of coding descriptor information; (c) periodically transmitting the first set of coding descriptor information at the determined repetition frequency; (d) detecting a triggering event, wherein the triggering event comprises receipt of a message from an access terminal; and (e) in response to detecting the triggering event, transmitting the second set of coding descriptor information. Triggering events may include receipt of a ranging request or a handoff request, or receipt or transmission of a paging message, among others.

Further, dividing the coding descriptor information into a first set and a second set may involve dividing the coding descriptor information into critical coding descriptor information, which is used in initial ranging, and into non-critical coding descriptor information. The critical and non-critical coding descriptor information may be further divided into critical downlink coding descriptor information, non-critical downlink coding descriptor information, critical uplink coding descriptor information, and non-critical uplink coding descriptor information.

The determination of the repetition frequency at which to periodically transmit the first set of coding descriptor information may be based upon one or more network usage characteristics. The network usage characteristics used in this determination may include, as examples, a rate of new connections, a rate of handoffs, and/or a rate of paging messages.

In another aspect, a method for transmitting coding descriptor information is disclosed. The method may also be carried out in a communications network that provides WiMAX service, wherein at least a portion of the network is characterized by one or more network usage characteristics. Further, the coding descriptor information may comprise downlink coding descriptor information and uplink coding descriptor information. The method comprises (a) dividing the coding descriptor information into a first set and a second set of coding descriptor information, wherein the first set comprises coding descriptor information that is used in initial ranging; (b) using one or more of the network usage characteristics as a basis for determining a first repetition frequency at which to periodically transmit the first set of coding descriptor information; (c) transmitting the first set of coding descriptor information at the first repetition frequency; (d) determining a second repetition frequency at which to periodically transmit the second set of coding descriptor information, wherein the second repetition frequency is less than the first repetition frequency; and (e) transmitting the second set of coding descriptor information at the second repetition frequency.

In another aspect, a system configured to transmit coding descriptor information is disclosed. The system may include (a) a processor for executing program code; (b) program code stored on data storage and executable by the processor to: (i) divide the coding descriptor information into a first set and a second set of coding descriptor information, wherein the first set comprises coding descriptor information that is used in initial ranging, and (ii) determine a repetition frequency at which to periodically transmit the first set of coding descriptor information; (c) a receiver configured to detect at least one triggering event; and (d) a transmitter configured to: (i) periodically transmit the first set of coding descriptor information at the determined repetition frequency; and (ii) transmit the second set of coding descriptor information in response to the detection of the triggering event.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 6 is a table showing MCSs currently supported by the WiMAX Standard.

DETAILED DESCRIPTION

Figure 1:
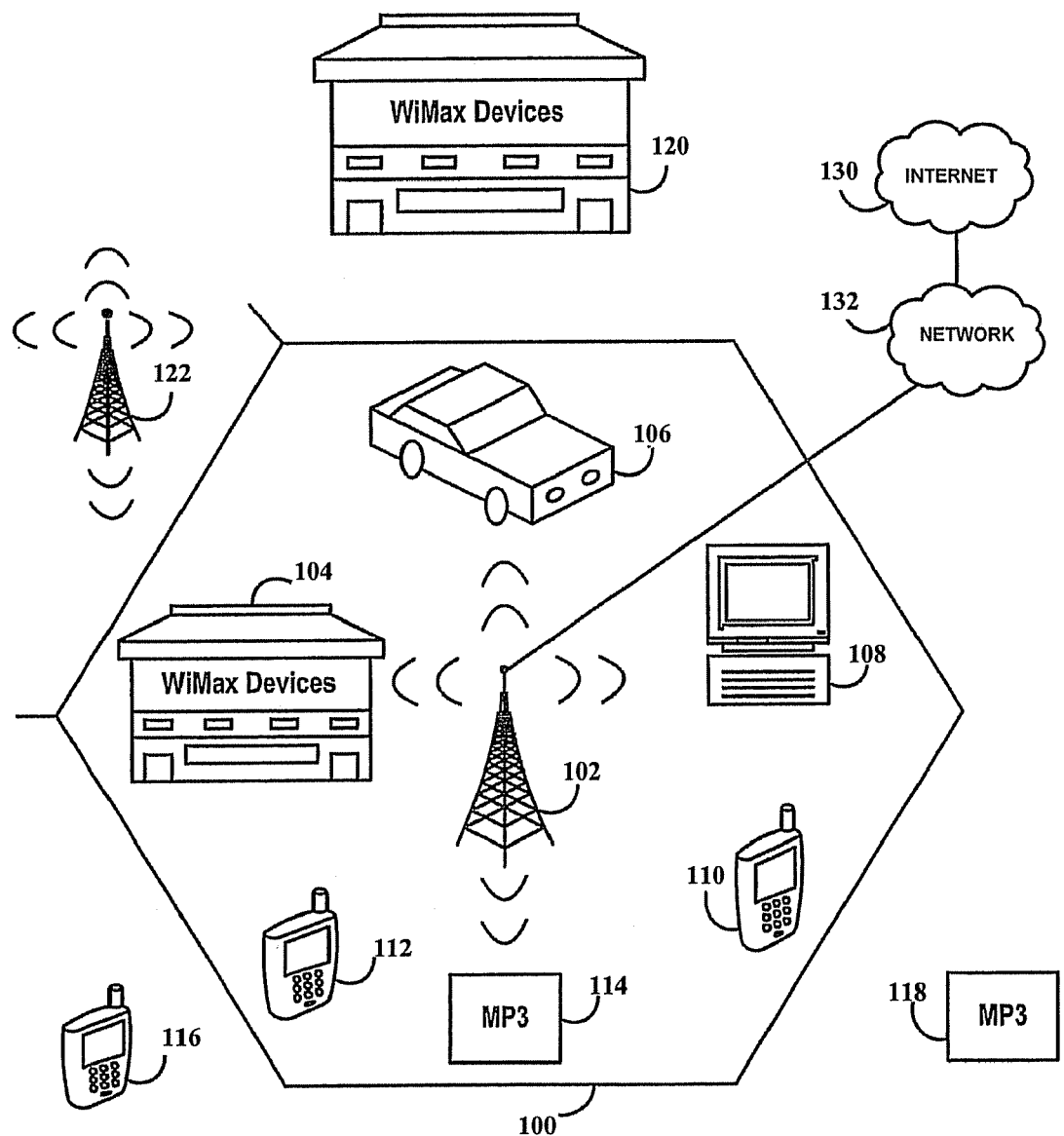
FIG. 1 is schematic representation of a coverage area where service is available from a WiMAX base station.

FIG. 1 is schematic representation of a coverage area 100 where service is available from a WiMAX base station 102. Also shown are a plurality of WiMAX client devices that may compete for ranging resources of the WiMAX base station 102. The client devices may take the form of, for example, WiMAX devices located in a building or home 104, such as computer, appliance or cell phone, WiMAX devices located in an automobile 106, a portable computer 108, a cellular telephone 110, a personal digital assistant 112, an MP3 player 114, another cell phone 116, another MP3 player 118 and/or various WiMAX devices located within an office building 120 such as computers, cell phones, game players, etc. Adjacent areas may be covered by other base stations, one of which is shown as base station 122.

Provided with a WiMAX connection via base station 102, a client device may engage in various types of communication. For instance, a base station 102 may provide connectivity to a packet-switched network 130 such as the Internet. Packet-data connectivity may be provided via a service provider's network 132 or directly. In addition to packet-data connectivity, a WiMAX connection may also provide access to other services such as voice-over-IP (VOIP), among others.

I. WiMAX Frame Structure

Figure 2:
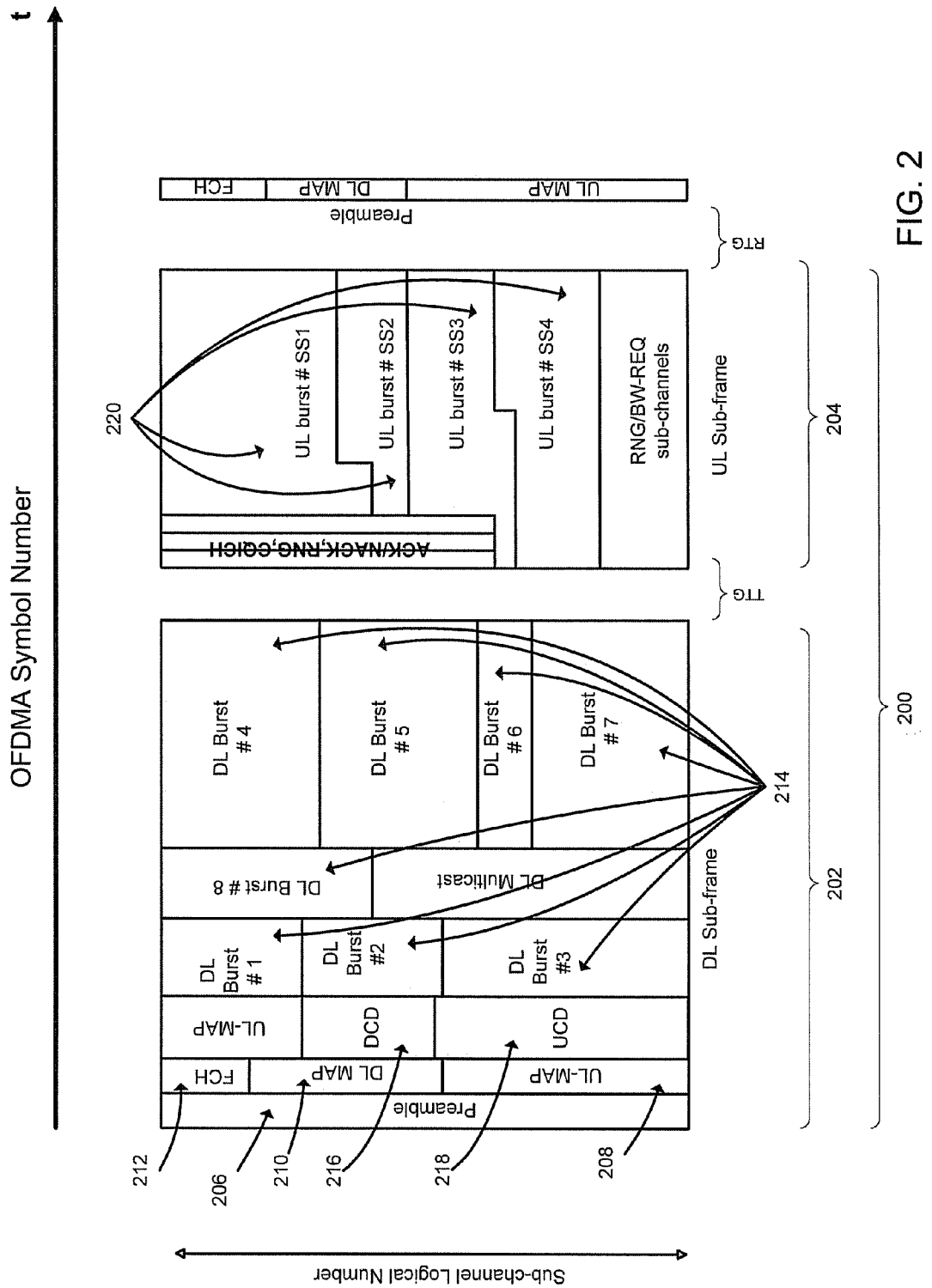
FIG. 2 is a block diagram illustrating the WiMAX frame structure.

In WiMAX, data communications between a client device and a WiMAX base station 102 may be formatted into data frames, the structure of which is illustrated in FIG. 2. Each frame 200 includes a downlink (DL) sub-frame 202 and an uplink (UL) sub-frame 204, which provide various sub-channels and zones for communicating both overhead information (e.g., for session setup, etc.) and user traffic data on the downlink and uplink, respectively. For example, in the DL sub-frame 202, a base station typically broadcasts a preamble 206, an uplink map (UL-MAP) 208, a downlink map (DL-MAP) 210, a Frame Control Header (FCH) 212, and various DL burst messages 214. When included in a frame, the DCD 216 and UCD 218 generally follow the FCH 212 and precede the UL-MAP 208 and DL-MAP 210. Preamble 206, UL-MAP 208, DL-MAP 210, DCD 216 and/or UCD 218, may be broadcast in a coverage area so that any client device within range of the transmitting base station can receive these transmissions. On the other hand, DL Bursts and UL Bursts typically include user traffic intended for specific clients, and thus are available only to those clients for which they are intended.

Referring to DL sub-frame 202 in greater detail, the preamble 206 is typically the first OFDM symbol in each WiMAX frame 200. The preamble 206 may include a pseudorandom number (PN) code, which may be used by a client device for synchronization with a base station. Following the preamble 206 is the FCH 212, which includes a DL Frame prefix that specifies a subchannel group for a first partial usage of subchannels (PUSC) zone, PUSC zones that do not use all sub-channels, and/or the forward-error correction (FEC) encoding code and the repetition code used for DL-MAP. The UL-MAP 208 and DL-MAP 210 may provide sub-channel allocation, as well as other control information for the UL sub-frame 204 and DL sub-frame 202, respectively. For instance, a base station may determine the burst sizes that each client device will be allocated in the DL sub-frame 202 and in the UL sub-frame 204, and include this information in the DL-MAP 210 and UL-MAP 208, respectively. Additional details of the preamble, the FCH and its parameters, and the DL-MAP and UL-MAP, are provided by the 802.16 standard.

In another aspect of WiMAX, information is coded and modulated before transmission. The particular coding and modulation used for a given transmission is referred to as the modulation and coding scheme (MCS) for the transmission. FIG. 6 is a table showing MCSs that are currently supported by the WiMAX Standard. Each row of the table corresponds to a different MCS. It should be understood that the scope of the invention should not be limited to current MCSs as the embodiments described herein may be implemented regardless of the MCSs used for WiMAX communications.

Referring to the table, MCSs that are coded using more bits are generally more reliable. In addition, modulation schemes using more power per bit of information transferred are also more reliable and may reach users at a greater distance from a transmitting base station. Thus, MCSs towards the top of the table, which employ more bits and/or more power per bit, are more efficient. However, these MCSs towards the top of the table (referred to as "lower MCS") are less efficient in term of network resource usage. According to 802.16, DCD and UCD are transmitted using the lowest modulation and coding (MCS), to enable all subscribers to receive the data. Lower MCSs, such as QPSK ⅛ for instance, use network resources less efficiently, but also have less stringent signal-to-noise requirements (e.g., CINR). In order to maximize the probability that all base stations in a given coverage area receive the DCD and UCD, the DCD and UCD are transmitted using a lower MCS. Doing so may greatly improve the probability of all users, including users at the edge of the coverage area or at any location within the coverage area where service is less than desired, receiving the DCD and UCD.

Figure 3A:
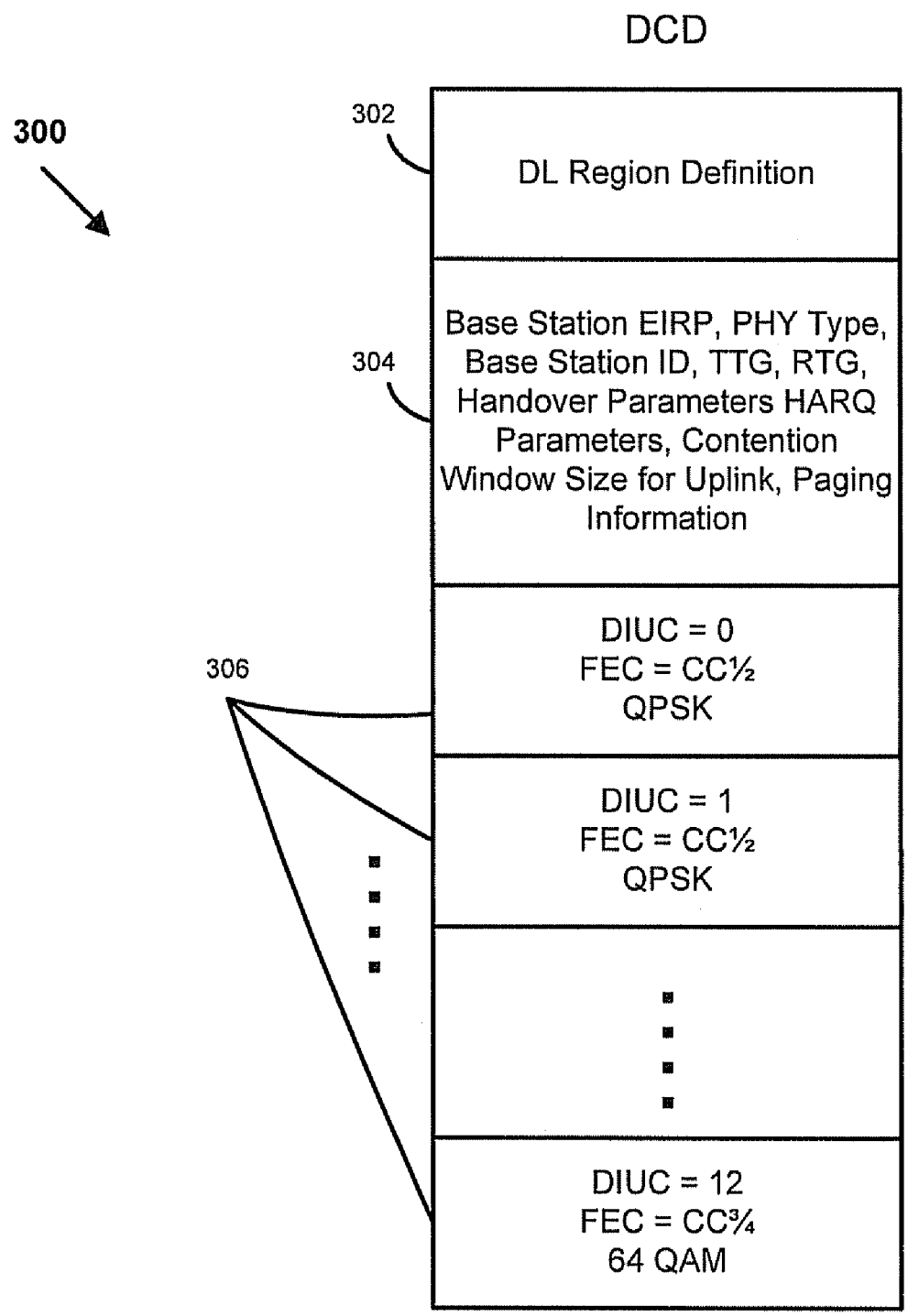
FIG. 3A is a block diagram illustrating the format of a downlink coding descriptor.

FIG. 3A is a block diagram illustrating the format of a DCD 300 in greater detail. The DCD includes coding descriptor information that describes the physical layer of the downlink in a WiMAX coverage area and that may be used by the client for downlink synchronization. Specifically, the DCD may include a DL Region Definition 302, which predefines the allocation of the downlink (i.e., the network resources from the frame as a whole that are designated for the DL subframe) and physical layer parameters and messages 304. The physical layer parameters and messages 304 may include (a) the base station Effective Isotropic Radio Power (EIRP), (b) the Physical Layer (PHY) Type, (c) the base station ID, (d) the Transmit/Receive Transition Gap (TTG), (e) the Receive/Transmit Transition Gap (RTG), (f) Handover Parameters, (g) Hybrid Automatic Repeat Request (HARM) Parameters, (h) the contention window size for ranging in the uplink, and/or (i) paging information. The details of the DCD, including the DL Region Definition, as well as the physical layer parameters and messages, are set forth in IEEE 802.16, and thus are not described in further detail herein.

The DCD 300 may also include burst profiles 306, which each correspond to one of the DL Bursts included in the frame. Each burst profile 306 may be identified by a downlink interval usage code (DIUC) and may function to define characteristics of a DL Burst that has been allocated for a particular user. In current implementations, a cell in a WiMAX network supports up to thirteen different burst profiles in the downlink, which corresponds to thirteen DL Bursts in the WiMAX frame. As such, DIUCs 0-12 are allocated to identify burst profiles in DCD 300. In addition, DIUC 13 is used to identify for Gap/Peak-to-Average Power Ratio (PAPR) reduction information, and DIUCs 14-15 may be used to identify extensions of the DCD 300, which may be used to provide additional information in the DCD.

In WiMAX, the size of a given DL Burst (i.e., the bandwidth or amount of network resources designated for the DL Burst) is generally determined by a scheduler. Specifically, the number of symbols and/or the number of subcarriers of a given DL Burst may be determined by a network scheduler running a scheduling algorithm according to the 802.16 Standard, or any other scheduling algorithm. As such, each burst profile 306 may generally provide the parameters of any forward error correction (FEC) used in the corresponding DL Burst, and thus may include parameters such as the channel encoding type, the coding rate, and the modulation scheme. As a specific example, a burst profile may indicate the channel encoding type, such as convolutional coding (CC) or convolutional turbo coding (CTC), which is used for a given DL Burst. The burst profile may also indicate the coding rate, such as ½, ¾, etc., which is used for the given DL Burst. Further, each burst profile 306 may include an indication of the modulation scheme (e.g., QPSK, 64 QAM, etc.) used in the transmission of the DL Burst. Further details of the DCD and DL burst profiles are provided by 802.16, and thus are not discussed herein.

Figure 3B:
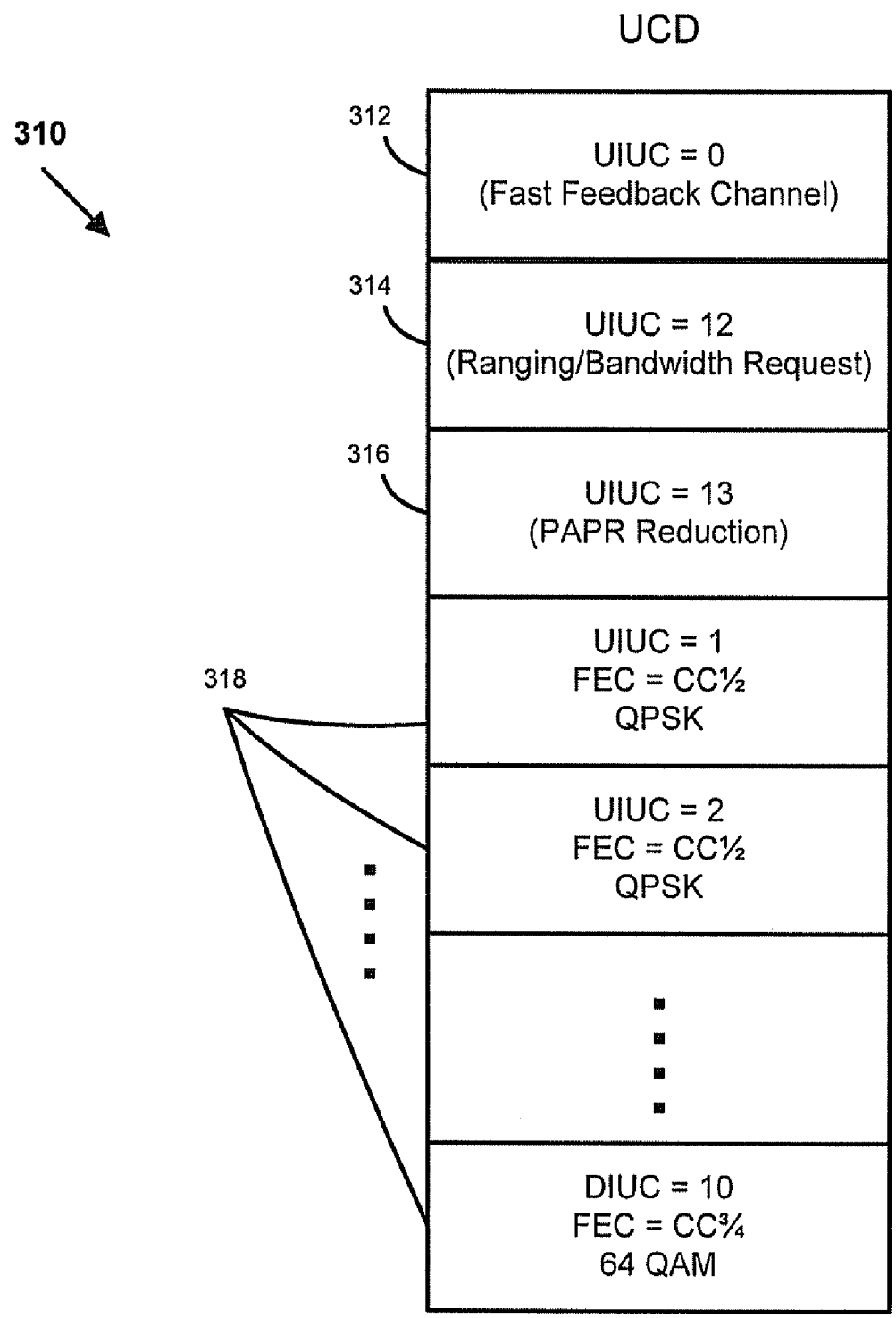
FIG. 3B is a block diagram illustrating the format of an uplink coding descriptor.

FIG. 3B is a block diagram illustrating the format of a UCD 310 in greater detail. The UCD describes the physical layer of the uplink in a WiMAX coverage area. The depicted UCD includes a fast feedback subchannel 312, which is identified by a Uplink Interval Usage Code (UIUC) of 0, a ranging/bandwidth request subchannel 314, which is identified by a UIUC of 12, and a PAPR reduction subchannel 316, which is identified by a UIUC of 13. In current implementations, a given cell in a WiMAX network can support up to ten different burst profiles in the uplink (i.e. ten UL Bursts). Accordingly, UCD 310 may include up to ten burst profiles 318 that are identified by UIUCs of 1-10, and having parameters similar to those described in reference to DCD 300. UCD 310 may also include CDMA allocation information, which is identified by a UIUC of 14. In addition, UIUCs 11 and 15 may be used to extend the UCD, thereby providing additional information in the UCD. Further details of the UCD and UL burst profiles are provided by 802.16, and thus are not discussed herein.

II. WiMAX Ranging

Figure 4:
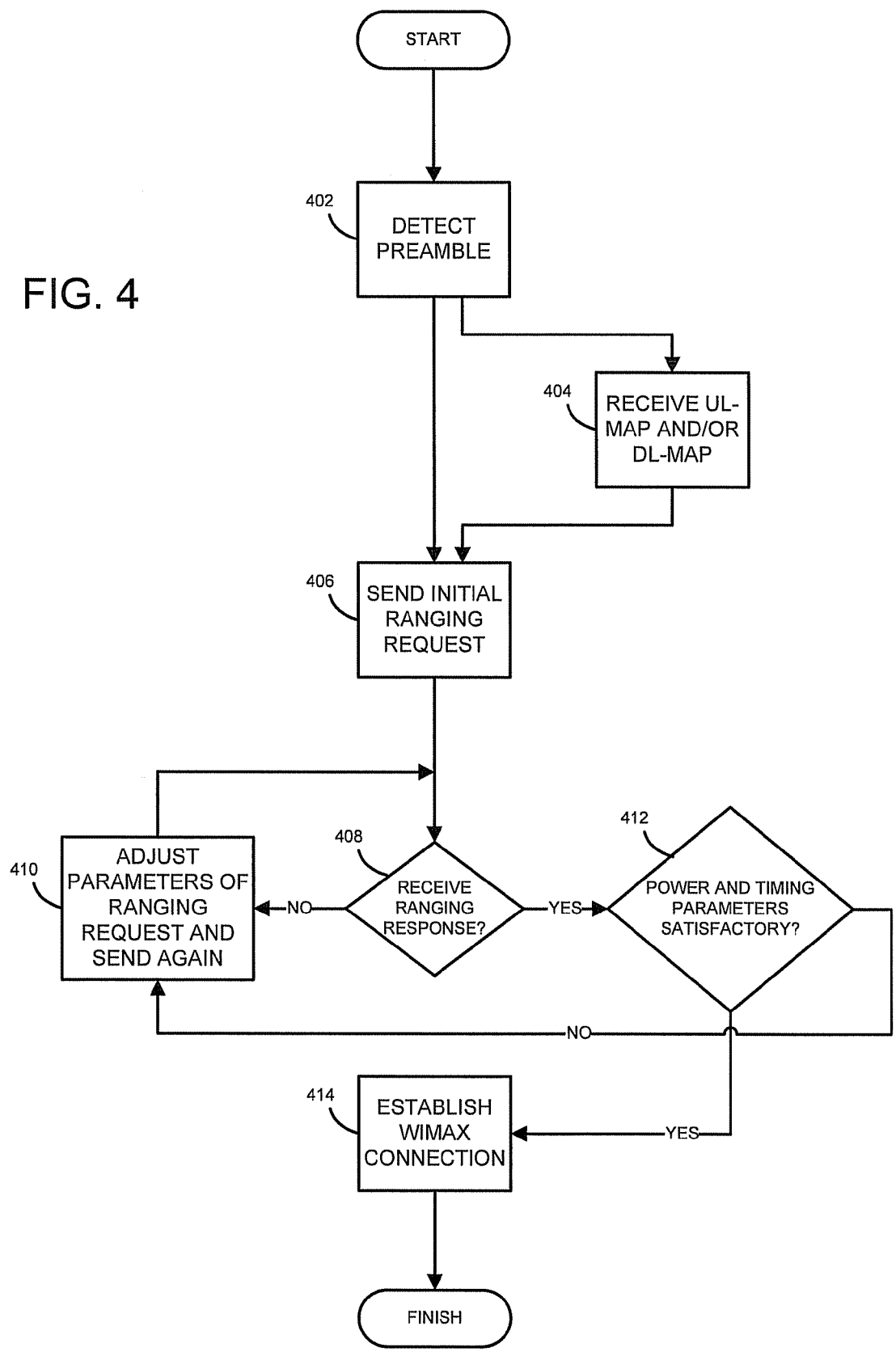
FIG. 4 is a simplified flow chart illustrating the initial ranging process in WiMAX.

In an exemplary embodiment, information that has typically been included in the DCD and/or UCD, may be divided up into critical and non-critical information, critical information generally being information that is used in the initial ranging process. Initial ranging is typically performed when a client device equipped with a WiMAX chipset (such as devices 104-120 in FIG. 1) attempts to obtain a connection to a WiMAX network. [ESMAIL FIG. 4 is a simplified flow chart illustrating the initial ranging process in WiMAX. Initially, the client device detects the preamble, which indicates that WiMAX service may be available from the base station, as shown by block 402. Once the client device finds the preamble, it has found a WiMAX base station and may attempt to establish a connection with the base station by engaging in initial ranging with the base station. In particular, the client device may detect and receive the DL-MAP and/or UL-MAP from the same base station, as shown by block 404, and may then send an initial ranging request to that base station, as shown by block 406. The next step depends on whether or not a ranging response is received, as illustrated by block 408. If no ranging response is received, the client device may adjust parameters of the initial ranging request, and send an initial ranging request with the adjusted parameters to the BTS, as shown by block 410. Generally, as long as no ranging response is received, the client device may continue to send initial ranging requests, increasing the power level and/or selecting a different initial ranging code in the successive requests, until a ranging response is received from the base station. Further, the client device may wait for an exponential backoff time or for another predetermined period of time between ranging requests.

Client devices typically send ranging requests via ranging sub-channels, which may be part of the UL sub-frame. In the case of an initial ranging request, the request is sent via an initial ranging (IR) subchannel in the UL sub-frame. IR subchannels are contention-based subchannels, meaning that multiple WCDs may use the same IR subchannel at the same time for initial ranging. To send an initial ranging request, a client device may transmit an initial ranging request over an IR subchannel for a two-symbol duration. Specifically, a WiMAX device selects one of the ranging codes allocated for initial ranging requests and sends a ranging request including the initial ranging code to the WiMAX base station.

When the base station receives the ranging request, the base station may send a ranging response to the client device. The response may indicate either that the power and timing parameters are satisfactory, or that the parameters should be adjusted, as shown by block 412. If the parameters should be adjusted, the client device adjusts accordingly, as shown by block 410. This back and forth process will continue until the base station is satisfied with the parameters of the connection (e.g., that the client device is assigned the appropriate subchannel, with the appropriate power and timing characteristics, etc.), at which point the base station may send a ranging response that includes a specific frequency, a specific bandwidth, a specific timeslot, and/or specific coding for the client device to use. This process establishes a dedicated subchannel between the base station and the device. The client device can then proceed to establish a connection with the base station, as shown by block 414.

More specifically, after establishing a dedicated sub-channel, the WiMAX device sends a response/ack message back to the base station. At this point, the device has not yet registered with the network, e.g., undergone authentication or higher application levels in the OSI reference model. Rather, the initial ranging process establishes the OSI Layer 1 (RF) settings for communication. After the initial ranging is completed, the device enters a session establishment step. This step occurs at Layer 2 of the OSI reference model and higher levels. This could involve the device registering with the network, registering with application servers, services, etc. These steps are fully described in the WiMAX standard and not discussed in detail herein.

III. Method and System for Transmitting Coding Descriptor Information

In general, the methods and systems disclosed herein may help reduce the network resources consumed by coding descriptor transmissions by taking advantage of advance indications that certain processes are going to occur, and for such processes, transmitting necessary coding descriptor information on an as-needed basis. On the other hand, there may be little or no advance notification as to when certain processes, such as initial ranging, are going to occur. Accordingly, the base station may periodically transmit the critical coding descriptor information used in such processes, without waiting for a signal or triggering event to prompt transmission.

Referring back to FIG. 2, when the DCD 216 and UCD 218 are included in a frame, considerable network resources may be designated for the DCD and UCD. This is particularly so because the DCD and UCD are typically transmitted using a lower MCS, so that all subscribers within range of the transmitting base station can receive the DCD and UCD. Since lower MCSs make less efficient use of network resources, and network resources designated for the DCD and UCD might otherwise be designated for user traffic, the inclusion of the DCD and UCD may result in a significant in decrease network throughput. Quantitatively, when both the DCD and UCD are automatically and periodically transmitted by the base station, the DCD and UCD may occupy up to 5 percent of the DL capacity.

In an exemplary embodiment, the base station automatically and periodically transmits only the coding descriptor information that is used in the initial ranging process. The coding descriptor information that is sent periodically may be referred to more generally as "critical information" or "critical coding descriptor information." Information that is not used in the initial ranging process (referred to as "non-critical information" or "non-critical coding descriptor information") may be transmitted after initial ranging has begun, in response to certain triggering events, such as receiving an initial ranging request from an access terminal. Alternatively or additionally, the base station may transmit non-critical coding descriptor information in response to a handoff request from an access terminal, and/or in response to sending a paging message to, or receiving a paging message from, an access terminal. On the other hand, there may be little or no advance notification as to when certain processes, such as initial ranging, are going to occur. Accordingly, the base station may periodically transmit the critical coding descriptor information used in such processes, without waiting for a signal or triggering event to prompt transmission. In this exemplary embodiment, approximately 10 to 30% of coding descriptor information is used in initial ranging and classified as critical information. Thus, the amount of resources allocated for sending coding descriptor information may be significantly reduced, as 70 to 90% of coding descriptor information may be sent on an as-needed basis.

Figure 5:
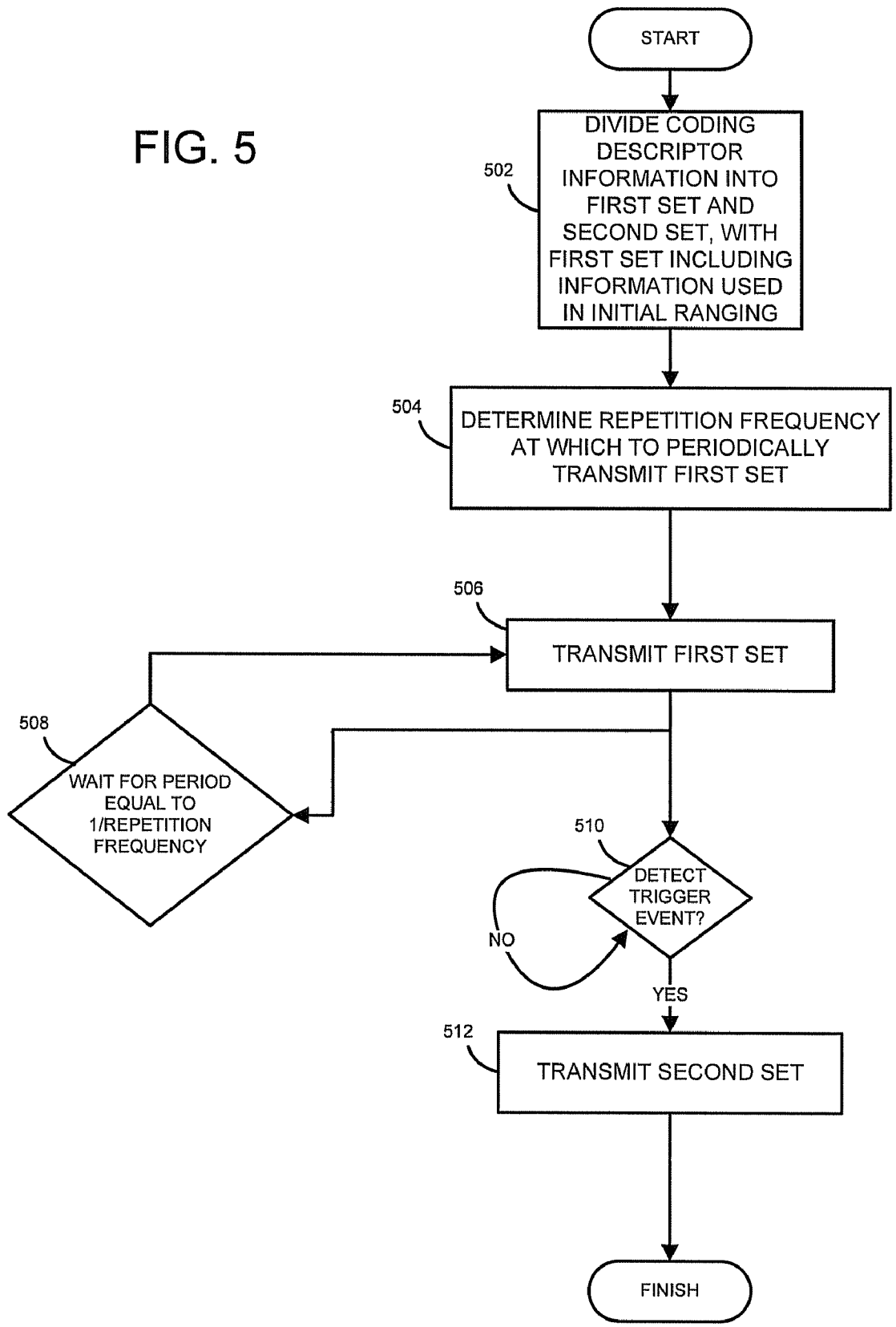
FIG. 5 is a flow chart illustrating a method for transmitting coding descriptor information in a communication network that is configured to provide WiMAX services.

Referring again to the figures, FIG. 5 is a flow chart illustrating a method for transmitting coding descriptor information in a communication network that is configured to provide WiMAX services. The method is described by way of example, with reference to an embodiment where the method is carried out by a base station. However, those skilled in the art will recognize that the method may be carried by other network entities or in combination with other network entities. The method involves dividing the coding descriptor information (i.e., the DCD and the UCD) into two sets of coding descriptor information, as shown by block 502. The first set may include "critical" coding descriptor information that is used in the initial ranging process, while the second set may include "non-critical" coding descriptor information, which may be used later, after initial ranging.

Preferably, the base station may classify coding descriptor information that is necessary to or is used in the initial ranging process as critical coding descriptor information (and in doing so create a first set of critical coding descriptor information). For instance, critical DCD information may include the DL Region Definition, the PHY Type, the TTG, and/or the RTG, and critical UCD information may include the ranging/bandwidth request channel and/or the CDMA allocation, parameters that are used to initiate initial ranging (e.g., the CDMA allocation) or in the process of initial ranging). Preferably, non-critical information includes any information that is typically provided by the DCD and UCD, but is not classified as critical. For instance, coding descriptor information such as burst profiles, PAPR reduction, and/or DCD/UCD extensions may be classified as non-critical information (and thus assigned to the second set of coding descriptor information). In other embodiments, additional coding descriptor information may also be classified as critical and/or the information above-specified as critical may be classified as non-critical. Moreover, other processes, in addition to or instead of initial ranging, may provide the basis for classifying coding descriptor information as critical and/or non-critical.

After dividing the coding descriptor information, the base station determines a repetition frequency at which to periodically transmit the first set of coding descriptor information, as shown by block 504. The base station then periodically transmits the first set of coding descriptor information at the repetition frequency, as shown by blocks 506-508. Accordingly, the period between transmissions is such that successive transmissions occur at the repetition frequency determined by the base station. More specifically, in order to periodically transmit at the repetition frequency, the base station transmits the first set, as shown by block 506, then waits for a period equal to one divided by the repetition frequency, as shown by block 508, then again transmits the first set (possibly with updated information), and so on. It will be understood that the term "repetition frequency" means how often the first set is transmitted (i.e. the repetition frequency is defined by the time period between two consecutive transmissions of the first set), and is not a signal frequency (such as a radio frequency (RF), etc.).

The base station may transmit the second set of coding descriptor information in response to certain triggering events, as shown by blocks 510-512. More specifically, the base station may detect a triggering event, as shown by block 510. When the triggering event is detected, the base station may then transmit the second set of coding descriptor information, as shown by block 512. As illustrated by the path looping back to block 510, non-critical information may be transmitted on an "as-needed" basis. Thus, the base station may refrain from transmitting the second set of non-critical information, except for in those instances where a triggering event is detected. Events such as receiving an initial ranging request from a client, receiving a handoff request from a client, receiving an indication that a handoff to the base station is going to occur, and sending a paging message to, or receiving a paging message from, a client, may trigger transmission of non-critical information. It should be understood that the base station generally determines when to transmit the second set of coding descriptor information independently from its determination of the repetition frequency at which to transmit the first set.

The repetition frequency with which critical information is broadcast by the base station may be based upon various network usage characteristics. Thus, to determine the repetition frequency, the access network may monitor network usage and/or maintain statistics that are indicative of network usage. Such statistics may include the frequency of new connection requests (i.e., the number of call requests during a predetermined period of time), the frequency of handoffs, and/or the paging frequency, among others. In an exemplary embodiment, the repetition frequency ($f_{CRIT}$) may be determined as:

$$f_{CRIT} = k(C1 * f_{NEW\_CALLS} + C2 * f_{HANDOFF} + C3 * f_{PAGING})$$

In this equation, "k", "C1", "C2", and "C3" are optimization parameters that are a matter of engineering design choice. Further, $f_{NEW\_CALLS}$ is the rate at which new calls or communication sessions are requested, $f_{HANDOFF}$ is the rate at which handoffs are requested, and $f_{PAGING}$ is the rate at which paging occurs (i.e. the rate at which paging messages are received and/or sent). The parameters $f_{NEW\_CALLS}$, $f_{HANDOFF}$, and $f_{PAGING}$ may be measured in requests per minute (requests/minute). As such, the parameter "k" may be measured in the number of critical information transmissions per request (critical information transmissions/request) which results in $f_{CRIT}$ being calculated in critical information transmissions per minute (critical information transmissions/minute). In an exemplary embodiment, $f_{NEW\_CALLS}$, $f_{HANDOFF}$, and $f_{PAGING}$ may be calculated over a predetermined period of time Critical_Call_Count. Further, $f_{CRIT}$ may be recalculated periodically, so that $f_{CRIT}$ is updated using more current network usage statistics.

As a specific example, with Critical_Call_Count equal to 1 minutes, k may be set equal to 0.1 critical information transmissions/request, and C1, C2, and C3 may all be set equal to the same value of 1, giving the equation:

$$f_{CRIT} = 0.1(f_{NEW\_CALLS} + f_{HANDOFF} + f_{PAGING})$$

During a given 1-minute period specified by Critical_Call_Count, the access network may determine that 10 calls are requested, 7 handoffs are requested, and 12 paging messages are received. Thus, $f_{NEW\_CALLS}$ is equal 10 requests/minute, $f_{HANDOFF}$ is equal to 7 requests/minute, and $f_{PAGING}$ is equal to 12 requests/minute. As a result, $f_{CRIT}$ is equal to 0.1*(10 requests/minute+7 requests/minute+12 requests/minute)=3.9 critical information transmissions per minute. This example is for illustrative purposes only. Those skilled in the art will understand that many other examples fall within the scope of the invention.

In addition, a maximum frequency for periodic transmission of the first set of critical information may be defined as $f_{MAX\_C}$. Once the base station determines $f_{CRIT}$, the base station may compare $f_{CRIT}$ to $f_{MAX\_C}$, and if $f_{CRIT}$ is greater than $f_{MAX\_C}$, the base station may periodically transmit the critical information using a repetition frequency of $f_{MAX\_C}$. If, on the other hand, $f_{CRIT}$ is less than or equal to $f_{MAX\_C}$, the base station simply transmits the critical information at $f_{CRIT}$ equal to the determined repetition frequency. In an alternative embodiment, the repetition frequency at which to periodically transmit the first set of critical information may be predetermined, as a matter of engineering design choice. In such an embodiment, the repetition frequency is likely set such that critical coding descriptor information will be transmitted more often than the non-critical coding descriptor information.

The method may further involve reducing the number of subchannels designated for sending the DCD and UCD. For instance, when sending critical DCD and/or UCD information, the base station uses only those subchannels necessary for transmission of the critical information. As such, subchannels that would otherwise be used for non-critical information, can be designated for DL Bursts, or for other information in the DL sub-frame. Similarly, in frames where the base station transmits non-critical DCD and/or UCD information, subchannels that would otherwise be designated for transmitting critical information, may be designated for other purposes.

Further, a maximum frequency for transmission of non-critical information $f_{MAX\_NC}$ may be defined. Generally, $f_{MAX\_NC}$ may be selected such that in times of high network traffic (i.e., when critical information is sent at $f_{MAX\_C}$ and non-critical information is sent at $f_{MAX\_NC}$), non-critical information is sent less frequently than critical information. However, variations from this general rule are possible without departing from the scope of the invention.

To implement the maximum frequency $f_{MAX\_NC}$ for transmission of non-critical information, the base station may define a minimum period of time $T_{MIN\_NC}$ between transmissions of non-critical information as:

$$T_{MIN\_NC} = \frac{1}{f_{MAX\_NC}}$$

As such, when the base station detects a triggering event, the base station may check whether or not the minimum period of time $T_{MIN\_NC}$ has elapsed since the last transmission of non-critical information. If the elapsed time since the last transmission of non-critical information is greater than or equal to $T_{MIN\_NC}$, the base station transmits the non-critical information. Otherwise, the base station waits until $T_{MIN\_NC}$ has elapsed, and then sends the non-critical information. It should be understood that a minimum period of time $T_{MIN\_C}$ between transmissions of critical information may be similarly defined in relation to $f_{MAX\_C}$.

In an alternative embodiment, the second set of non-critical information may be transmitted periodically. In such embodiments, a repetition frequency for transmitting non-critical information may be determined in a similar manner as the repetition frequency for critical information, or may simply be predetermined. In such an embodiment, the repetition frequency is likely set, or factors likely weighted (if the repetition frequency is determined in a manner similar as for critical information), such that non-critical information is transmitted less frequently than the critical information.

In another aspect, a coding descriptor indicator (CDI), which indicates whether or not a given frame includes coding descriptor information, may be included in a WiMAX frame. In particular, the CDI may be included in the DL-MAP or UL-MAP of a WiMAX frame. A CDI may be included in every frame, or only in selected frames (with the absence of the CDI in a frame thus indicating that no coding descriptor information is included in the frame). Thus, an exemplary method may further involve transmitting a CDI that indicates to an access terminal that coding descriptor information is being, or is about to be, transmitted.

The CDI may further indicate the type of coding descriptor information, critical and/or non-critical, which is included in a given frame. For instance, the CDI take the form of a 2-bit symbol, with an associated coding scheme defined such that "00" indicates that the frame does not include any coding descriptor information, "01" indicates that the frame includes critical information (but no non-critical information), "10" indicates that the frame includes non-critical information (but no critical information), and "11" indicates that the frame includes both critical and non-critical information. In another embodiment, the CDI may indicate the presence of both DCD and UCD critical and/or non-critical information, independently. As an example, the CDI may take the form of two symbols (i.e., a 4-bit value), with an associated coding scheme defined such that the first symbol indicates the presence of DCD critical and non-critical information (e.g., "00xx", "01xx", "10xx", and "11 xx", with each "x" representing a bit that is indicative of UCD presence), while the second symbol indicates the presence of UCD critical and non-critical information (e.g., "xx00", "xx01", "xx10", and "xx11", with each "x" representing a bit that is indicative of DCD presence). Other formats and coding schemes for the CDI are also possible.

In another aspect, the first set of critical coding descriptor information may be further divided into subsets of critical coding descriptor information, and transmissions of these subsets may be staggered. For instance, the WiMAX network might divide critical coding descriptor information into subsets for DCD critical coding descriptor information and UCD critical coding descriptor information. The WiMAX network may then periodically transmit the DCD critical coding descriptor information with a first repetition frequency, and periodically transmit the UCD critical coding descriptor information with a second repetition frequency. The DCD critical coding descriptor information and the UCD critical coding descriptor information may be transmitted at the same frequency (i.e., with the first repetition frequency equal to the second repetition frequency), or with different repetition frequencies. In any of these scenarios, the result may be that an access terminal receives the DCD critical coding descriptor information at a different time than it receives the UCD critical coding descriptor information.

Similarly, the second set of non-critical coding descriptor information may be further divided into subsets of non-critical coding descriptor information. In particular, the non-critical coding descriptor information may be divided into subsets that each correspond to a different triggering event. As such, when a given triggering event occurs, the subset of non-critical coding descriptor information corresponding to that triggering event may be transmitted. For example, when a handoff request is received from an access terminal, a subset of non-critical coding descriptor information corresponding to the handoff request, which may generally be coding descriptor information that is used in the handoff process, may be transmitted. Other examples are also possible.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In a communications network providing WiMAX service, a method for transmitting coding descriptor information, wherein the coding descriptor information comprises downlink coding descriptor (DCD) information and uplink coding descriptor (UCD) information, the method comprising:
    dividing the coding descriptor information into a first set and a second set of coding descriptor information, wherein the first set comprises coding descriptor information that is used in initial ranging;
    determining a repetition frequency at which to periodically transmit the first set of coding descriptor information;
    periodically transmitting the first set of coding descriptor information at the determined repetition frequency;
    detecting a triggering event, wherein the triggering event comprises receipt of a message from an access terminal, and wherein the message comprises a ranging request, a handoff request, or a paging message; and
    in response to detecting the triggering event, transmitting the second set of coding descriptor information.

2. The method of claim 1, wherein dividing the coding descriptor information into a first set and a second set of coding descriptor information comprises:
    dividing the coding descriptor information into critical coding descriptor information that is used in initial ranging and non-critical coding descriptor information;
    wherein the first set of coding descriptor information comprises the critical coding descriptor information and the second set of coding descriptor information comprises the non-critical coding descriptor information.

3. The method of claim 2, wherein dividing the coding descriptor information into critical coding descriptor information that is critical to initial ranging and non-critical coding descriptor information comprises:
    dividing the DCD information into critical DCD information that is critical to initial ranging and non-critical DCD information that is not critical to initial ranging; and
    dividing the UCD information into critical UCD information that is critical to initial ranging and non-critical UCD information that is not critical to initial ranging.

4. The method of claim 3, wherein the critical DCD information comprises a downlink region definition, PHY Type, TTG, and/or RTG.

5. The method of claim 3, wherein the critical UCD information comprises ranging information, bandwidth request information, and/or CDMA allocation.

6. The method of claim 1 wherein determining a repetition frequency at which to periodically transmit the first set of coding descriptor information comprises:
using one or more network usage characteristics as a basis for determining the repetition frequency at which to periodically transmit the first set of coding descriptor information.

7. The method of claim 6, wherein the one or more network usage characteristics comprise a rate of new connections, a rate of handoffs, and/or a rate of paging messages.

8. The method of claim 6, further comprising periodically repeating the step of determining a repetition frequency at which to periodically transmit the first set of coding descriptor information comprises, thereby updating the repetition frequency as the network usage characteristics change over time.

9. The method of claim 1, further comprising:
comparing the determined repetition frequency to a maximum repetition frequency; and
if the determined repetition frequency is greater than the maximum repetition frequency, setting the determined repetition frequency to be to the maximum repetition frequency.

10. The method of claim 1, further comprising:
determining an elapsed period of time since a previous transmission of the second set of coding descriptor information; and
comparing the elapsed period of time to a minimum period of time, and if the elapsed period of time is less than the minimum period of time, waiting until the elapsed period of time since the previous transmission of the second set of coding descriptor information is equal to or greater than the minimum period of time, and then transmitting the second set of coding descriptor information.

11. The method of claim 1, further comprising transmitting a coding descriptor indicator, wherein the coding descriptor indicator indicates whether or not a given frame includes coding descriptor information.

12. The method of claim 11, wherein the coding descriptor indicator further indicates whether or not whether or not a given frame includes critical coding descriptor information and/or non-critical coding descriptor information.

13. The method of claim 12, wherein the coding descriptor indicator separately indicates whether or not whether or not a given frame includes critical coding descriptor information and/or non-critical coding descriptor information for downlink coding descriptor information and for uplink coding descriptor information.

14. In a WiMAX communication network, wherein at least a portion of the network is characterized by one or more network usage characteristics, a method for transmitting coding descriptor information, the method comprising:
dividing the coding descriptor information into a first set and a second set of coding descriptor information, wherein the coding descriptor information comprises downlink coding descriptor (DCD) information and uplink coding descriptor (UCD) information, and wherein the first set comprises coding descriptor information that is used in initial ranging;
using one or more of the network usage characteristics as a basis for determining a first repetition frequency at which to periodically transmit the first set of coding descriptor information;
transmitting the first set of coding descriptor information at the first repetition frequency;
determining a second repetition frequency at which to periodically transmit the second set of coding descriptor information, wherein the second repetition frequency is less than the first repetition frequency;
comparing the second repetition frequency to a maximum repetition frequency, and if the second repetition frequency is greater than the maximum repetition frequency, setting the determined repetition frequency to be to the repetition frequency interval; and
transmitting the second set of coding descriptor information at the second repetition frequency.

15. A system configured to transmit coding descriptor information in a WiMAX communication network, the system comprising:
a processor for executing program code;
program code stored on data storage and executable by the processor to:
divide the coding descriptor information into a first set and a second set of coding descriptor information, wherein the coding descriptor information comprises downlink coding descriptor (DCD) information and uplink coding descriptor (UCD) information, and wherein the first set comprises coding descriptor information that is used in initial ranging;
determine a repetition frequency at which to periodically transmit the first set of coding descriptor information; and
a receiver configured to detect at least one triggering event, wherein the triggering event comprises a ranging request, a handoff, or a paging message; and
a transmitter configured to:
periodically transmit the first set of coding descriptor information at the determined repetition frequency; and
transmit the second set of coding descriptor information in response to the detection of the triggering event.

16. The system of claim 15, wherein program code stored on data storage and executable by the processor to divide the coding descriptor information into a first set and a second set of coding descriptor information comprises:
program code stored on data storage and executable by the processor to divide the coding descriptor information into critical coding descriptor information that is critical to initial ranging and non-critical coding descriptor information that is not critical to initial ranging, wherein the first set of coding descriptor information comprises the critical coding descriptor information and the second set of coding descriptor information comprises the non-critical coding descriptor information.

17. The system of claim 16, wherein the critical coding descriptor information comprises ranging information, bandwidth request information, and/or a CDMA allocation.

18. The system of claim 16, wherein the program code stored on data storage and executable by the processor determine a repetition frequency at which to periodically transmit the first set of coding descriptor information comprises:
program code stored on data storage and executable by the processor to use one or more network usage parameters as a basis to determine the repetition frequency at which to periodically transmit the critical coding descriptor information.

* * * * *